United States Patent
Inagawa et al.

(10) Patent No.: US 9,487,162 B2
(45) Date of Patent: Nov. 8, 2016

(54) PILLAR GARNISH

(71) Applicant: TOYOTA BOSHOKU KABUSHIKI KAISHA, Aichi-ken (JP)

(72) Inventors: Keisuke Inagawa, Toyota (JP); Masayuki Kito, Miyoshi (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/829,954

(22) Filed: Aug. 19, 2015

(65) Prior Publication Data

US 2016/0068116 A1    Mar. 10, 2016

(30) Foreign Application Priority Data

Sep. 4, 2014  (JP) .................................. 2014-180137

(51) Int. Cl.
*B60R 13/02* (2006.01)
*B60R 21/213* (2011.01)
*B60R 21/216* (2011.01)

(52) U.S. Cl.
CPC .......... *B60R 13/025* (2013.01); *B60R 13/0206* (2013.01); *B60R 21/213* (2013.01); *B60R 21/216* (2013.01)

(58) Field of Classification Search
CPC ............. B60R 13/025; B60R 13/0206; B60R 21/213
USPC ........... 296/1.08, 187.08, 193.06; 280/730.2, 280/728.2
See application file for complete search history.

(56) References Cited

U.S. PATENT DOCUMENTS

| | | | |
|---|---|---|---|
| 6,333,515 B1 * | 12/2001 | Kubota | B60R 13/0206 280/728.1 |
| 2002/0167152 A1 * | 11/2002 | Preisler | B60R 21/04 280/728.3 |
| 2007/0075531 A1 * | 4/2007 | Tsuge | B60R 13/02 280/730.2 |
| 2010/0109300 A1 * | 5/2010 | Inui | B60R 13/025 280/728.3 |
| 2010/0295272 A1 * | 11/2010 | Aoki | B60R 13/0206 280/728.2 |
| 2011/0140481 A1 * | 6/2011 | Labbe | B60R 21/34 296/193.06 |
| 2013/0168515 A1 * | 7/2013 | Yamamoto | B60R 13/0206 248/231.81 |
| 2014/0319808 A1 * | 10/2014 | Yamamoto | B60R 13/0206 280/730.2 |
| 2015/0130174 A1 * | 5/2015 | Gillay | B60R 21/214 280/743.2 |
| 2015/0217715 A1 * | 8/2015 | Kim | B60R 21/213 280/730.2 |
| 2016/0068115 A1 * | 3/2016 | Inagawa | B60R 13/025 296/193.06 |
| 2016/0167614 A1 * | 6/2016 | Inami | B60R 13/0206 280/730.2 |

FOREIGN PATENT DOCUMENTS

JP       2014-037216       2/2014

* cited by examiner

*Primary Examiner* — Jason S Morrow

(57) ABSTRACT

A pillar garnish for covering a pillar of a vehicle includes a first garnish component and a second garnish component. The first garnish component is made of thermoplastic elastomer olefin and includes a sidewall opposite an airbag disposed between the pillar and the pillar garnish. The second garnish component is made of material having rigidity higher than the first garnish component and disposed so as to overlap the first garnish component. The second garnish component includes a garnish body having a plate-like shape and a clip mount for holding a tether clip to be fixed to the pillar. The clip mount protrudes from a surface of the garnish body on a pillar side.

9 Claims, 6 Drawing Sheets

PILLAR GARNISH

CROSS REFERENCE TO RELATED APPLICATION

This application claims priority from Japanese Patent Application No. 2014-180137 filed on Sep. 4, 2014. The entire contents of the priority application are incorporated herein by reference.

TECHNICAL FIELD

The present disclosure relates to a pillar garnish.

BACKGROUND

A pillar garnish is a component of a vehicle that covers a pillar of the vehicle. The pillar garnish may be mounted to the pillar with a tether clip.

An airbag may be disposed between the pillar and the pillar garnish. When the airbag is deployed in a collision, a back surface of the pillar garnish is pressed by the airbag. A clip portion of the tether clip comes off a clip mount of the pillar garnish. As a result, a displacement of the pillar garnish is allowed and thus pillar garnish does not block the deployment of the airbag. In a later stage of the deployment of the airbag, an anchor of the tether clip is hooked to the clip mount of the pillar garnish. According to the configuration, the pillar garnish is less likely to fly off the pillar.

The pillar garnish is expected not to break when pressed by the airbag. Thermoplastic elastomer olefin (TPO) that has relatively high flexibility is considered as a material of the pillar garnish. If the pillar garnish is made of TPO, the rigidity of the clip mount for holding the tether clip may decrease. When the anchor of the tether clip is hooked to the clip mount, the clip mount may be deformed and the anchor may not be properly held by the clip mount.

If the thermoplastic elastomer olefin is used for the pillar garnish, the tether clip may not be used. In this case, the pillar garnish may be fixed to the pillar with a screw instead of the tether clip. A head of the screw may be located on the surface of the pillar garnish, that is, appearance of the pillar garnish may decrease.

An object is to provide a pillar garnish that is to be mounted to a pillar of a vehicle with a tether clip and less likely to break when pressed by an airbag.

SUMMARY

A pillar garnish for covering a pillar of a vehicle includes a first garnish component and a second garnish component. The first garnish component is made of thermoplastic elastomer olefin and includes a sidewall opposite an airbag disposed between the pillar and the pillar garnish. The second garnish component is made of material having rigidity higher than the first garnish component and disposed so as to overlap the first garnish component. The second garnish component includes a garnish body having a plate-like shape and a clip mount for holding a tether clip to be fixed to the pillar. The clip mount protrudes from a surface of the garnish body on a pillar side.

DETAILED DESCRIPTION

An embodiment will be described with reference to FIGS. 1 to 6. A front pillar garnish 30 attached to a vehicle interior side of a front pillar 20 in a vehicle will be described.

Figure 1:
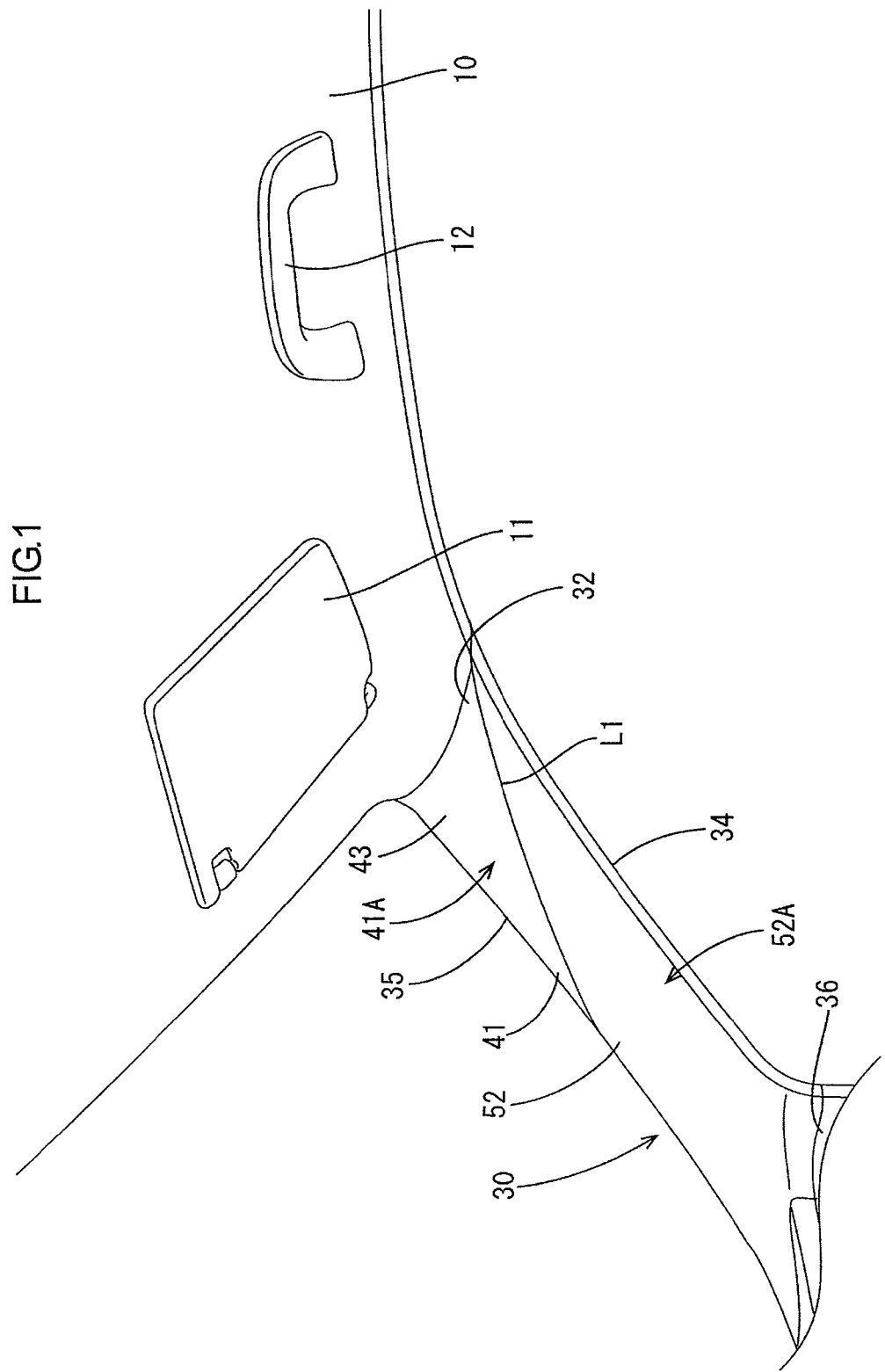
FIG. 1 is a perspective view of an interior of a vehicle including a front pillar garnish according to an embodiment.

FIG. 1 is a perspective view illustrating an interior of the vehicle viewed toward the right front from a driver's seat. A roof lining 10, which is a ceiling interior component, is attached to a ceiling of the vehicle. A sun visor 11 and an assist grip 12 are mounted to the roof lining 10.

Figure 4:
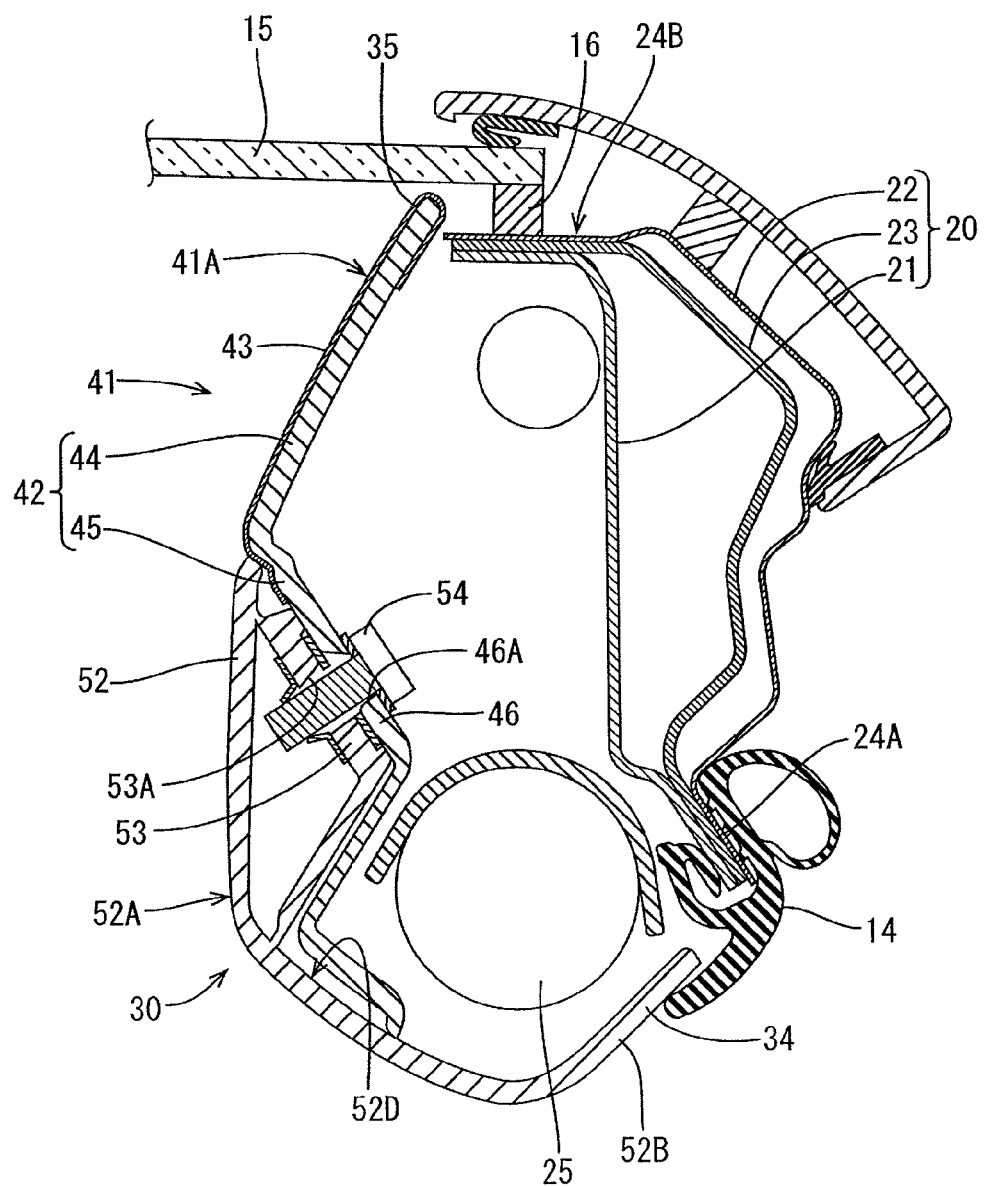
FIG. 4 is a cross-sectional view of the pillar garnish along line IV-IV in FIG. 2.

As illustrated in FIG. 4, the front pillar 20 includes an inner panel 21, an outer panel 22, and a reinforcement panel 23. The inner panel 21 and the outer panel 22 are disposed on the interior side and on the exterior side, respectively. The reinforcement panel 23 is disposed between the inner panel 21 and the outer panel 22.

Edge portions of the panels 21, 22 and 23 are overlaid on one another and connected with one another. A portion of the front pillar 20 including the edge portions of the panels 21, 22 and 23 closer to the rear of the vehicle is referred to as a rear overlaid portion 24A. A portion of the front pillar 20 including the edge portions of the panels 21, 22 and 23 closer to the front of the vehicle is referred to as a front overlaid portion 24B. A weather strip 14 is attached to the rear overlaid portion 24A. A sealing member 16 that is an elastic member is disposed between the front overlaid portion 24B and a side edge of a front windshield 15.

The front pillar garnish 30 is mounted to the inner panel 21 of the front pillar 20 so as to cover the inner panel 21 from the interior side of the vehicle. As illustrated in FIG. 4, an airbag 25 (a curtain shield airbag) which is not yet deployed.

The front pillar garnish 30 has an elongated shape that extends along a direction in which the front pillar 20 extends. As illustrated in FIG. 1, the front pillar garnish 30 is angled toward the rear of the vehicle as a distance from a bottom thereof toward a top thereof increases. The front pillar garnish 30 includes a first side edge 35 closer to the front of the vehicle, a second side edge 34 closer to the rear of the vehicle, a bottom edge closer to the bottom of the vehicle, and a top edge 32 closer to the top of the vehicle.

Figure 3:
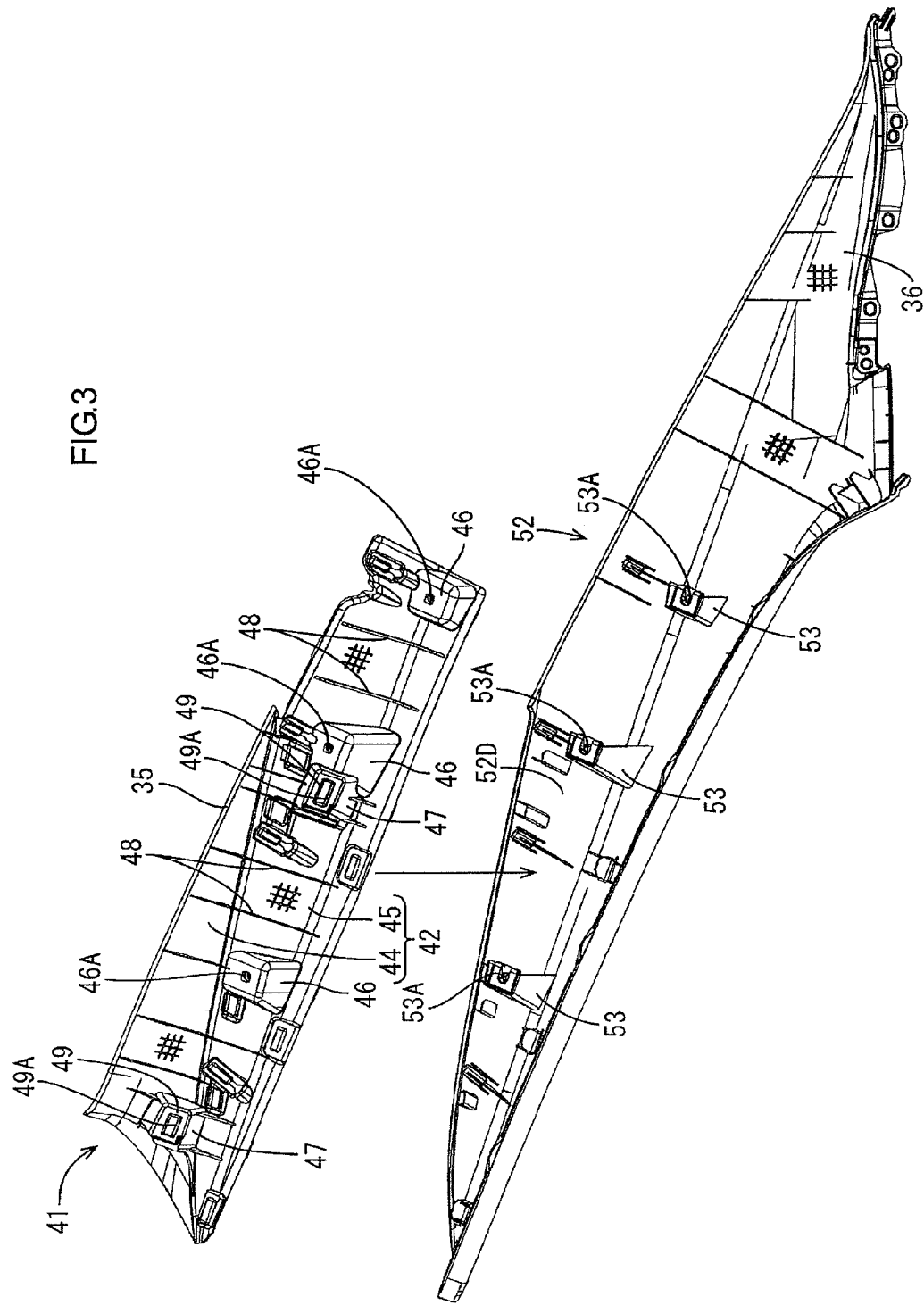
FIG. 3 is an exploded perspective view of the front pillar garnish.

As illustrated in FIG. 3, the front pillar garnish 30 includes a first garnish component 52 and a second garnish component 41 that are disposed so as to overlap each other. In FIG. 1, the front edge, the rear edge, and the bottom edge of the first garnish component 52 correspond with a bottom half of a first side edge 35, the second side edge 34, and the bottom edge of the front pillar garnish 30. The top edge and the front edge of the second garnish component 41 correspond with a portion of the top edge 32 and a top half of the first side edge 35.

Figure 5:
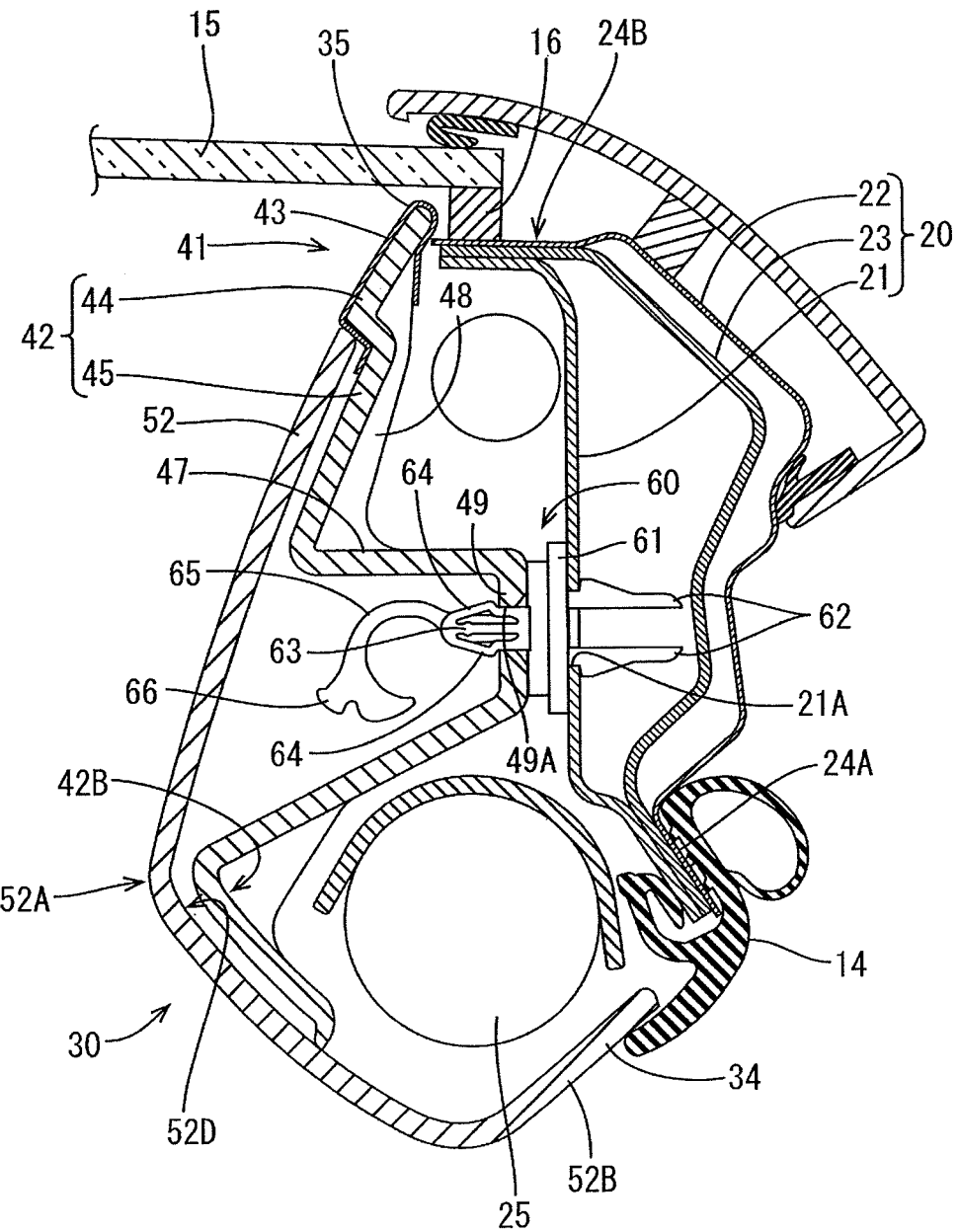
FIG. 5 is a cross-sectional view of the pillar garnish along line V-V in FIG. 2.

As illustrated in FIG. 5, the first garnish component 52 includes a sidewall 52B that is opposite the airbag 25. The airbag 25 is configured to be deployed toward the rear of the vehicle (the lower side in FIG. 5) and the sidewall 52B is arranged more to the rear of the vehicle than the airbag 25 (in the direction in which the airbag 25 is deployed).

The first garnish component 52 is made of thermoplastic elastomer olefin (TPO). The first garnish component 52 has elasticity. The second garnish component 41 has rigidity higher than the first garnish component 52.

The second garnish component 41 is made of Toyota super olefin polymer (TSOP, a registered trademark). The TSOP is a resin material that includes polypropylene crystals dispersed in continuous phases of the elastomers.

The materials of the first garnish component 52 and the second garnish component 41 are not limited to those described above. The second garnish component 52 may be made of a material that is a combination of the material of the first garnish component 52 (TPO) and fillers such as glass fibers. With such a material, the second garnish component 41 has rigidity higher than the first garnish component 52.

As illustrated in FIG. 5, the second garnish component 41 includes a base member 42 (a garnish body) having a rectangular plate-like shape. As illustrated in FIG. 3, the base member 42 includes a main wall 44 and an extending wall 45. The main wall 44 includes a design surface 41A of the second garnish component 41 (see FIG. 1). The extending wall 45 extends from an edge of the main wall 44 so as to overlap a back surface 52D (a surface on the vehicle exterior side) of the first garnish component 52. The extending wall 45 is arranged so as not to overlap the sidewall 52B of the first garnish component 52.

Ribs 48 protrude from the back surface of the base member 42 and extend along the short dimension of the base member 42. The ribs 48 are arranged along the long dimension of the base member 42.

Figure 2:
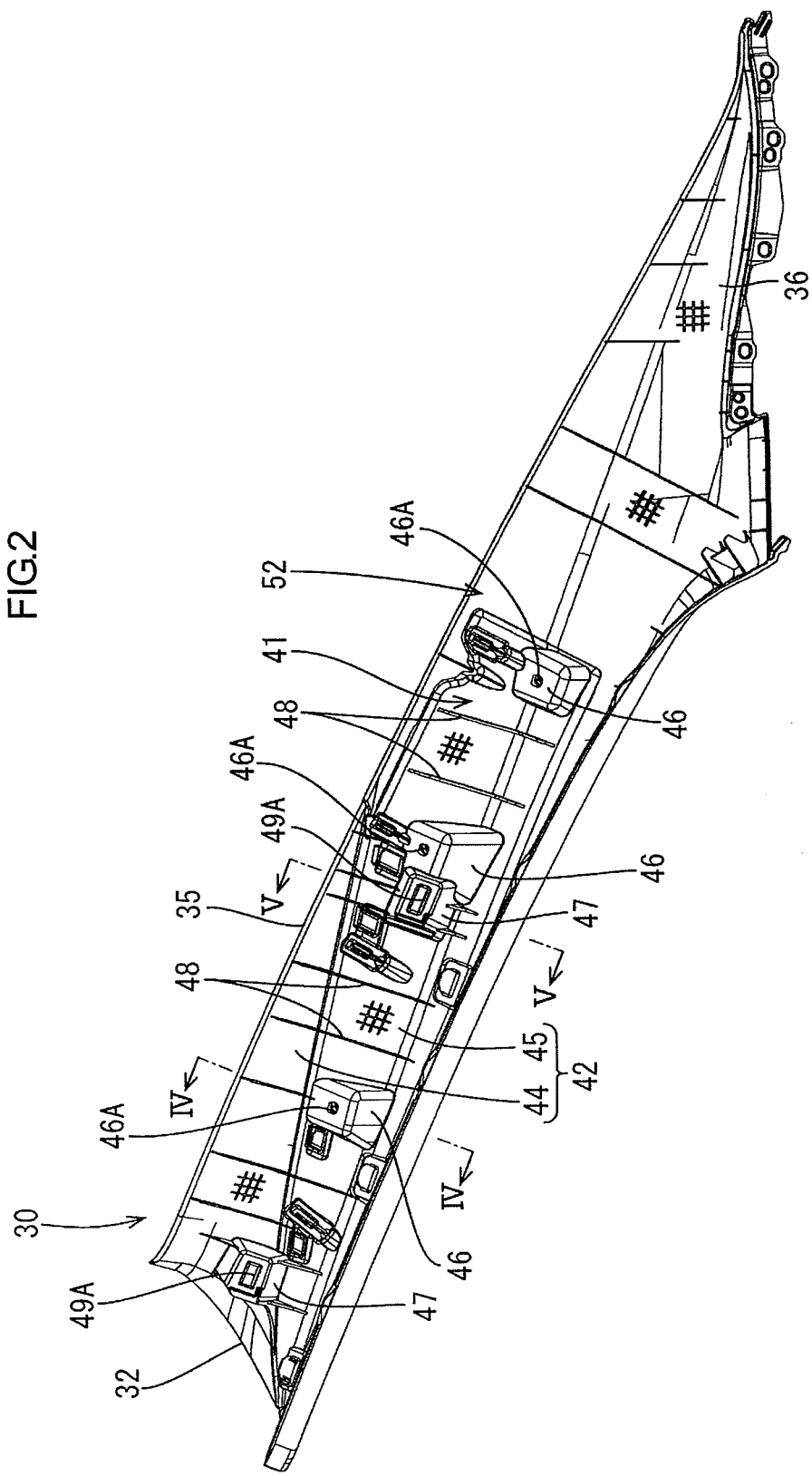
FIG. 2 is a perspective rear view of the front pillar garnish.

As illustrated in FIG. 2, the main wall 44 has a triangular shape. In FIGS. 2 and 3, a skin member 43 is not illustrated. As illustrated in FIG. 4, the skin member 43 is attached to the front surface of the main wall 44 with an adhesive. The surface of the skin member 43 is the design surface 41A of the second garnish component 41.

The skin member 43 has flexibility. A material of the skin member 43 may be genuine leather, synthetic leather, or synthetic resin. However, the material is not limited to those and any appropriate material may be used. A skin member is not attached to the first garnish component 52 and a surface of a base member of the first garnish component 52 is a design surface 52A.

A color of the skin member 43 and a color of the first garnish component 52 are different from each other. Namely, the design of the first garnish component 52 and the design of the second garnish component 41 are different from each other. The color of the skin member 43 and the color of the design surface of the roof lining 10 may be the same. The skin member 43 may be provided in white and the first garnish component 52 may be provided in black. The colors of the skin member 43 and the first garnish component 52 are not limited to white and black, respectively.

A boundary L1 between the first garnish component 52 and the second garnish component 41 extends from the first side edge 35 to the top edge 32. The boundary L1 is angled toward the rear as a distance from the bottom thereof toward the top increases. The boundary L1 ends at the right edge of the roof lining 10.

As illustrated in FIG. 3, mounting protrusions 53 protrude from the back surface of the first garnish component 52 toward the second garnish component 41. Each of the mounting protrusions 53 has a box-like shape with an opening. A distal end surface of each mounting protrusion 53 has an insertion hole 53A that is a through hole.

Fixing protrusions 46 protrude from portions of the extending wall 45 corresponding to the mounting protrusions 53. The fixing protrusions 46 are formed by protruding portions of the extending wall 45 on the back surface side. The fixing protrusions 46 have insertion holes 46A that are through holes at portions corresponding to the insertion holes 53A.

As illustrated in FIG. 4, the mounting protrusions 53 are inserted into the fixing protrusions 46 from the vehicle interior side and fitted, respectively. Bolts 54 are inserted in the insertion holes 46A and the insertion holes 53A. As a result, the extending wall 45 (i.e., the second garnish component 41) is fixed to the first garnish component 52. Fixing members for fixing the extending wall 45 to the first garnish component 52 are not limited to the bolts. They may be fixed with thermal caulking.

As illustrated in FIG. 5, the second garnish component 41 is mounted to the inner panel 21 with tether clips 60. The base member 42 includes clip mounts 47 that protrude from the back surface 42B of the base member 42 and hold the tether clips 60, respectively.

The clip mounts 47 protrude from the back surface 42B of the base member 42 (the surface on the inner panel 21 side, a surface of the garnish body on a pillar panel side) toward the inner panel 21. The clip mounts 47 open toward the interior of the vehicle. As illustrated in FIG. 3, the main wall 44 includes one of the clip mount 47 and the extending wall 45 includes the other clip mount 47. The shape and the number of the clip mounts 47 are not limited to those described above and may be altered as appropriate.

As illustrated in FIG. 5, distal ends of the clip mounts 47 are configured as seating surfaces 49 and arranged opposite the inner panel 21. Each seating surface 49 has a seating surface-side mounting hole 49A that is a through hole for the tether clip 60.

Each tether clip 60 includes a plate 61 (a body) made of synthetic resin, a pair of fixing pieces 62 (a first fixing portion), and a base member-side mounting protrusion 63 (a second fixing portion). The fixing pieces 62 protrude from the plate 61 toward the inner panel 21. The base member-side mounting protrusion 63 protrudes from the plate 61 toward the seating surface 49.

The fixing pieces 62 in each pair are opposed to each other. The fixing pieces 62 are inserted in a panel-side mounting hole 21A formed in the inner panel 21 and fixed. The fixing pieces 62 are elastically deformable such that a distance between the fixing pieces 62 decreases.

Because of the elastic deformation, the fixing pieces 62 are inserted into the panel-side mounting hole 21A from the vehicle interior side. After inserted, the fixing pieces 62 recover from the elastic deformation and thus the fixing pieces 62 are held against an edge of the panel-side mounting hole 21A from the vehicle exterior side.

The base member-side mounting protrusion 63 is inserted in the seating surface-side mounting hole 49A having a rectangular shape from the vehicle exterior side. The base member-side mounting protrusion 63 includes a pair of fixing projections 64 that protrude toward sides. The fixing projections 64 are held against an edge of the seating surface-side mounting hole 49A from the vehicle interior side.

The fixing projections 64 are elastically deformable. When the fixing projections 64 are deformed, a width of the base member-side mounting protrusion 63 (a dimension in the vertical direction in FIG. 6) decreases. As a result, the base member-side mounting protrusion 63 passes through the seating surface-side mounting hole 49A.

A tether 65 (an extending portion) extends from a tip of the base member-side mounting protrusion 63. The tether 65 curves toward the rear of the vehicle as a length thereof from the tip of the base member-side mounting protrusion 63 increases. The tether 65 is configured to pass through the seating surface-side mounting hole 49A.

A tip of the tether 65 includes an anchor 66 (a fixing portion) at the tip thereof. The anchor 66 is configured to hook to the seating surface 49 from the vehicle interior side when the fixing projections 64 are released from the seating surface 49 (more specifically, from the edge of the seating surface-side mounting hole 49A) during deployment of the airbag 25. The tether 65 and the anchor 66 are retained in the clip mount 47.

The airbag 25 presses the sidewall 52B of the first garnish component 52 when the airbag 25 is deployed toward the rear of the vehicle. The front pillar garnish 30 tilts toward the inner side of the compartment with the first side edge 35 as a base.

During the tilting of the front pillar garnish 30, the positions of the clip mounts 47 shift away from the inner panel 21. The fixing projections 64 of the tether clips 60 are pressed by the seating surfaces 49 (more specifically, the edges of the seating surface-side mounting holes 49A) and deformed. As a result, the base member-side mounting protrusions 63 come out of the seating surface-side mounting holes 49A. Namely, the retention of the front pillar garnish 30 by the tether clips 60 is released and the tilting of the front pillar garnish 30 is not restricted.

Figure 6:
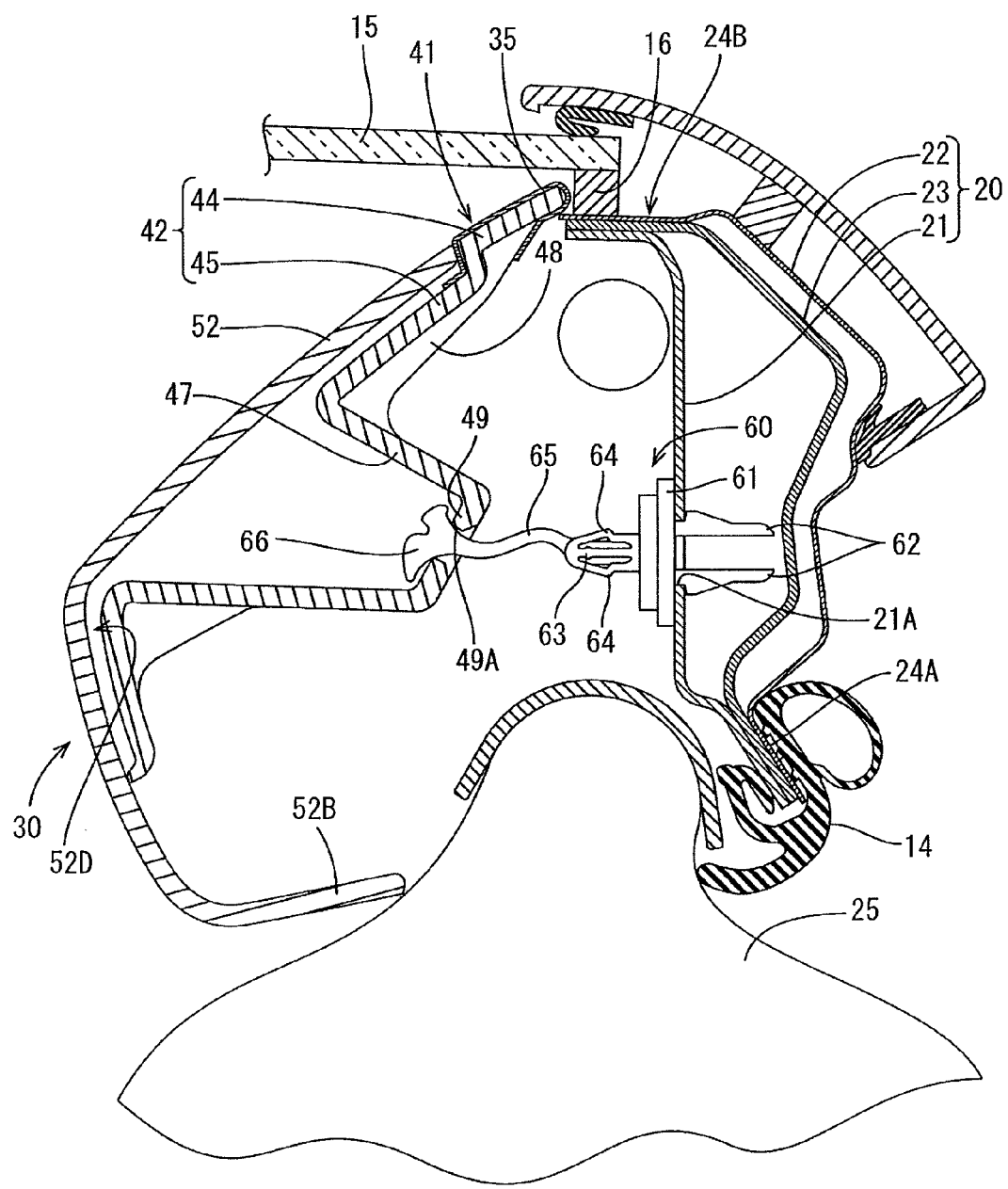
FIG. 6 is a cross-sectional view of the pillar garnish with a deployed airbag.

The tethers 65 pass through the seating surface-side mounting holes 49A as the front pillar garnish 30 tilts. As illustrated in FIG. 6, the anchors 66 are hooked to the edges of the seating surface-side mounting holes 49A from the vehicle interior side. According to the configuration, the front pillar garnish 30 is less likely to fly, that is, disposition of the front pillar garnish 30 toward the inner side of the compartment is allowed only by the length of the tethers 65.

The sidewall 52B of the first garnish component 52 is easily deformed because the first garnish component 52 is made of the thermoplastic elastomer olefin having relatively low rigidity. Therefore, the sidewall 52B is less likely to break during the deployment of the airbag 25.

The clip mounts 47 for holding the tether clips 60 are made of the material having higher rigidity than the first garnish component 52. Therefore, the clip mounts 47 are less likely to be deformed by the load applied thereto by the tether clips 60 during the deployment of the airbag 25.

Specifically, when the anchors 66 of the tether clips 60 are hooked to the edges of the seating surface-side mounting holes 49A, the seating surfaces 49 are less likely to be deformed and thus the anchors 66 are less likely to come off the clip mounts 47.

The connection between the inner panel 21 and the front pillar garnish 30 are ensured by the tether clips 60 and thus the front pillar garnish 30 is further less likely to fly. This embodiment includes the tether clips 60 and the front pillar garnish 30 that is less likely to break when the load is applied thereto by the airbag 25.

The base member 42 includes the main wall 44 and the extending wall 45. The main wall 44 includes the design surface 41A of the second garnish component 41. The extending wall 45 extends from the edge of the main wall 44 so as to overlap the back surface of the first garnish component 52. The clip mounts 47 protrude from the extending wall 45.

According to the configuration in which the extending wall 45 of the second garnish component 41 is arranged so as to overlap the back surface of the first garnish component 52, the high rigidity of the front pillar garnish 30 is achieved. In a collision of the vehicle, the front pillar garnish 30 is not easily deformed and thus an impact is effectively absorbed in the collision. The extending wall 45 is arranged so as not to overlap the sidewall 52B of the first garnish component 52 (the sidewall on the side to which the airbag 25 is deployed). Therefore, the extending wall 45 does not block the airbag 25 to be deployed.

The clip mounts 47 protrude from the surface of the base member 42 on the inner panel 21 side toward the inner panel 21.

With the clip mounts 47 that are protrusions, the rigidity of the second garnish component 41 is further increased. According to the configuration, the second garnish component 41 is not easily deformed during the collision of the vehicle and the impact is more effectively absorbed in the collision.

The front pillar garnish 30 includes the first garnish component 52 and the second garnish component 41. The first garnish component 52 and the second garnish component 41 are differently designed. Namely, more sophisticated design is provided.

OTHER EMBODIMENTS

The technology described herein is not limited to the above embodiments described in the above description and the drawings. The following embodiments may be included in the technical scope of the present invention.

(1) A pillar garnish for a center pillar of a vehicle is also included in the technical scope of the present invention.

(2) The first garnish component 52 may include a skin member.

(3) A tether clip having the following configuration may be included in the scope of the present invention. The tether clip includes a first fixing portion fixed to the inner panel 21 and a second fixing portion fixed to the clip mount 47. The first fixing portion and the second fixing portion are connected together with a loose string. During the deployment of the airbag 25, the displacement of the front pillar garnish 30 is allowed by the length of the string.

The invention claimed is:

1. A pillar garnish for covering a pillar of a vehicle, the pillar garnish comprising:
   a first garnish component made of thermoplastic elastomer olefin and including a sidewall opposite an airbag disposed between the pillar and the pillar garnish; and
   a second garnish component made of material having rigidity higher than the first garnish component and disposed so as to overlap at least a portion of the first garnish component, the second garnish component including:
      a garnish body having a plate-like shape; and
      a clip mount for holding a tether clip to be fixed to the pillar, the clip mount protruding from a surface of the garnish body on a pillar side.

2. The pillar garnish according to claim 1, wherein the garnish body includes:
   a main wall including a design surface of the second garnish component; and
   an extending wall extending from an edge of the main wall and disposed so as to overlap with a back surface of the first garnish component, and
   the clip mount protrudes from the extending wall.

3. The pillar garnish according to claim 1, wherein the clip mount protrude from a surface of the garnish body on a pillar side toward the pillar.

4. The pillar garnish according to claim 2, wherein the extending wall overlaps a portion of the first garnish component other than the sidewall of the first garnish component.

5. The pillar garnish according to claim 4, wherein the main wall of the second garnish component does not overlap the first garnish component.

6. The pillar garnish according to claim 2 further comprising another clip mount that protrudes from the main wall.

7. The pillar garnish according to claim 2, wherein
the main wall of the second garnish component includes a side edge to contact with the pillar,
the sidewall of the first garnish component is on a side of the pillar garnish opposite to the side edge of the main wall of the second garnish component to contact with the pillar, and
the side edge of the main wall of the second garnish component is a base of tilt of the pillar garnish during deployment of the airbag.

8. The pillar garnish according to claim 2, wherein
the first garnish component includes a mounting protrusion that protrudes from a back surface of the first garnish component toward the second garnish component,
the extending wall includes a fixing protrusion that protrudes from a back surface of the extending wall and has a shape along the mounting protrusion of the first garnish component, and
the fixing protrusion is fitted to the mounting protrusion.

9. The pillar garnish according to claim 8, further comprising a bolt, wherein the mounting protrusion and the fixing protrusion are fixed to each other with the bolt.

* * * * *